United States Patent
Viebahn et al.

[11] Patent Number: 5,798,713
[45] Date of Patent: Aug. 25, 1998

[54] PROCESS FOR REPRESENTING FLIGHT GUIDANCE INFORMATION

[75] Inventors: Harro Von Viebahn, Seeheim-Jugenheim; Christian Below; Heribert Kling, both of Frankfurt am Main, all of Germany

[73] Assignee: VDO Luftfahrtgerate Werk GmbH, Frankfurt, Germany

[21] Appl. No.: 507,265

[22] PCT Filed: May 3, 1994

[86] PCT No.: PCT/DE94/00490

§ 371 Date: Aug. 18, 1995

§ 102(e) Date: Aug. 18, 1995

[87] PCT Pub. No.: WO94/25828

PCT Pub. Date: Nov. 10, 1994

[30]     Foreign Application Priority Data

May 5, 1993 [DE] Germany .................. 43 14 811.5

[51] Int. Cl.$^6$ .................................. G01C 21/00
[52] U.S. Cl. ............... 340/974; 340/973; 340/975
[58] Field of Search ................ 340/971, 972, 340/973, 974, 975, 976, 961, 980, 967, 968, 970, 977, 978, 979; 364/460, 461, 428, 439, 424, 430, 434; 342/29, 33; 701/1, 3, 4, 14, 15, 120, 300, 301, 16

[56] References Cited

U.S. PATENT DOCUMENTS

| | | | |
|---|---|---|---|
| 3,711,826 | 1/1973 | La Russa | 340/975 |
| 4,484,189 | 11/1984 | Dettmer | 340/974 |
| 5,150,117 | 9/1992 | Hamilton et al. | 340/973 |
| 5,181,028 | 1/1993 | Sharpe et al. | 340/974 |
| 5,289,185 | 2/1994 | Ramier et al. | 340/972 |
| 5,420,582 | 5/1995 | Kubbat et al. | 340/974 |

FOREIGN PATENT DOCUMENTS

| | | |
|---|---|---|
| 0396071 | 11/1990 | European Pat. Off. |
| 0418558 | 3/1991 | European Pat. Off. |
| 1196872 | 7/1965 | Germany |
| 2107059 | 4/1983 | United Kingdom |

*Primary Examiner*—Brent A. Swarthout
*Attorney, Agent, or Firm*—Milde, Hoffberg & Macklin, LLP

[57] ABSTRACT

According to a process for representing information for guiding the flight of an aircraft, the airspace with at least one horizon and the precalculated flight path of the aircraft are three-dimensionally represented by means of an image display device and the surface above the horizon is subdivided into strips of different colours which extend parallel to the horizon. When the point of the precalculated flight path of the aircraft coincides with its shadow, the symbol that represents said precalculated flight path advantageously takes the position of the shadow projected on the ground. The shadow is preferably represented by a transparent design.

10 Claims, 6 Drawing Sheets

PROCESS FOR REPRESENTING FLIGHT GUIDANCE INFORMATION

BACKGROUND OF THE INVENTION

This invention relates to method of representing flight guidance information of an aircraft, wherein a spatial representation of the airspace, comprising at least one horizon and the precalculated flight path of the aircraft, is effected with the aid of an image reproduction device.

A method such as this has become known through the published German Patent Application DE 39 30 862 A1, its corresponding European Patent No. 0,418,558 and its corresponding U.S. Pat. No. 5,420,582, which is incorporated herein by reference. It improves the procedure of imparting information by means of an image which is subsequently experienced by natural observation habits, so that the mental load on the pilot is also reduced. Moreover, the symbolism used constitutes a complete item of information which enables the position and movement in space to be monitored and predetermined flight paths and short-term navigation to be adhered to. Qualitative information, determined by the manner of the display, appears in the foreground, and is supplemented by the necessary quantitative indications. The pilot's task is made easier by a summary of the information relevant to the flight phase within an overall image which is of favorable ergonomic form.

In addition, this known method permits pre-control of the aircraft, wherein the consequences of a control input are immediately identifiable. Possible unwanted developments—for example stalling at take off—can be identified and prevented before they actually occur. The pilot's time for reaction is prolonged and safety is thereby increased.

SUMMARY OF THE INVENTION

The principal object of the present invention is a further improvement of the known method with respect to a more intensive recording of information.

In a first embodiment of the invention, provision is made for the area above the horizon, which is preferably displayed blue, to be subdivided into strips of different hue which run parallel to the horizon, and for a predetermined pitch angle to correspond to each strip. In this respect it has been shown to be advantageous if the predetermined pitch angle is 10°. By means of this embodiment of the invention, the banking of the aircraft is displayed, even at large pitch angles, if the ground or the horizon in particular is no longer visible or is only partly visible on the screen. In addition, the change in color imparts further information on the magnitude of the pitch angle. In particular, this becomes clear in another development of the invention, in which a warning color appears above a predetermined maximum pitch angle. This further form of the invention results in a clear warning before the aircraft stalls.

In another embodiment, in which numerical indications of the pitch angle are displayed in addition and, wherein the numerical indications, preferably two, are displayed in an imaginary projection of the plane of the aircraft, the indications are transparent. In this connection, provision is preferably made for the indications to be figures inside a frame, wherein the respective background (sky, ground) is visible in the part of the frame which is not covered by the figures.

By means of this embodiment of the invention, a transition from a positive to a negative pitch angle and vice versa is particularly clearly indicated in that the marker indicating the pitch angle also changes its background color—namely from the color of the sky to the color of the ground. This embodiment may preferably be employed together with the first embodiment referred to above.

If the aircraft is flying within a scheduled route lane, the altitude of the aircraft within the scheduled route lane cannot always be identified with certainty, despite the spatial representation of the scheduled route lane and the anticipated flight path. According to another embodiment of the invention, provision is therefore made for vertical deviations from a scheduled flight path displayed in the airspace to be displayed as colored markers on the perpendicular peripheries of a scheduled route lane encompassing the scheduled flight path. In this connection, provision is preferably made for the markers to be lines which run parallel to the limiting edges of the scheduled route lane.

One significant advantage, amongst others, of the known method is that it is clearly visible when the precalculated flight path touches the ground. In particular, this is the situation when in the known method a shadow of the symbols representing the precalculated flight path is projected on to the ground and this shadow coincides with the symbol itself when there is contact with the ground. To obtain further clarification of the point of touch-down, according to a further embodiment of the present invention when the front of the precalculated flight path coincides with its shadow the respective symbol representing the precalculated flight path assumes the position of the shadow falling on the ground. A sudden collapse of the symbol into the plane of the ground in relation to those symbols which represent the precalculated flight path of the aircraft which is still flying makes the point of touch-down particularly clear.

In order to make objects (runways, radio beacons) which are represented on the ground also visible underneath the symbols, provision is made, according to another embodiment of the invention, for the precalculated flight path projected on the ground (shadow) to be of transparent design.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
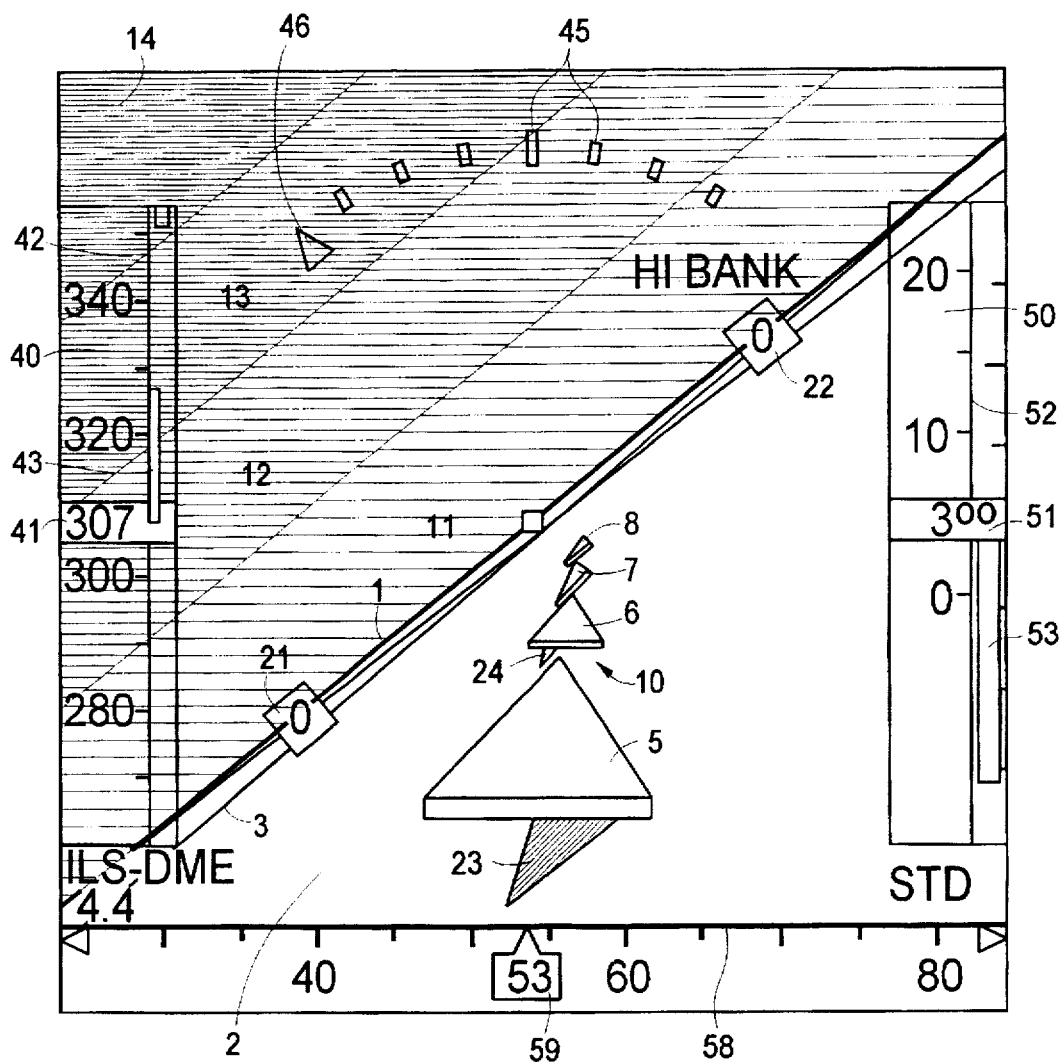
FIG. 1 is an illustration of a display screen image according to the invention for an aircraft which is sharply banked.

FIGS. 1 to 6 illustrate screen images in various flight situations, in order to elucidate the method according to the invention. Devices for implementing the known method cited at the outset have already been described in the aforementioned U.S. Pat. No. 5,420,582 . Since these devices are also suitable for implementing the method according to the present invention, no further description will be given herein.

In the Figures, the same parts are denoted by the same reference numerals. The screen image is preferably colored. However in FIGS. 1 to 6 the screen images are reproduced as monochrome drawings. Where areas of different hue are of particular importance to the invention, these are represented by grids of dots of different densities.

FIG. 1 shows a screen image obtained while the aircraft is flying with a sharp inclination (bank) to the right. The horizon 1 accordingly has a slanting position. In the example illustrated the ground (earth's surface) 2 is flat and is covered by a grid 3 which is aligned in a north-south direction, towards the magnetic poles for example. The distance between the grid lines is preset and in a preferred embodiment of the invention can be switched between one nautical mile and one geodetic minute of arc. In the representation of FIG. 1, the aircraft is flying very low, so that only a few grid lines are visible, in contrast to FIGS. 3 to 6.

Since in the perspective representation the number of grid lines is very large in the region of the horizon, it would be necessary without further measures to calculate very many grid lines, which could no longer be represented anyway for reasons of resolution. No more lines are therefore calculated and represented in a surface region 4 in front of the horizon, but this surface region 4 (FIGS. 3 to 6) is provided with a colour which is matched to the colour effect produced by the colour of the ground and by the lines of the grid becoming closer.

In the examples of embodiments illustrated the precalculated flight path is represented by triangular segments 5 to 8. In this respect, the individual segments 5 to 8 represent the precalculated position, the altitude, the course and the air position of the aircraft, respectively. The sum of the segment-shaped symbols 5 to 8, i.e. the total part of the precalculated flight path which is represented, is hereinafter called the predictor 10.

In addition to the information described above, the pilot receives an impression of the speed, in that the extension of the individual symbols 5 to 8 in the direction of flight and thus the total length of the predictor depends on the speed. Another item of speed information is imparted by the color, in such a way that in a non-critical speed range the surfaces of the symbols have a first color, green for example, whereas when approaching inadmissibly high or inadmissibly low speeds the color of those symbols for which speeds of this type are precalculated becomes an appropriate warning color, red and orange for example.

Since where the aircraft is flying to is ultimately of interest to the pilot, the predictor 10 is aligned overall in accordance with the precalculated course above ground. However, since the heading also constitutes an important item of information for the pilot—particularly when landing with a side wind—the first symbol 5 of the predictor 10 is aligned in accordance with the heading.

The fact that the symbols 5 to 8 are not represented as areas but as segments with a predetermined thickness leads to a significant improvement in the spatial impression. In one embodiment which has been implemented the visible edges are kept dark green.

The sky is represented as various strips parallel to the horizon, each of which is a different hue. As used herein the term "hue" is used in its most general sense to include differences in shade or saturation of a single color as well as differences in a color itself. In this connection, the height of each strip preferably corresponds to a pitch angle of 10°. In imitation of nature, the sky is displayed in blue, and starting from a pale bright blue at the horizon the blue becomes darker or more intense with increasing height. Four strips 11 to 14 are visible in FIG. 1.

Figure 2:
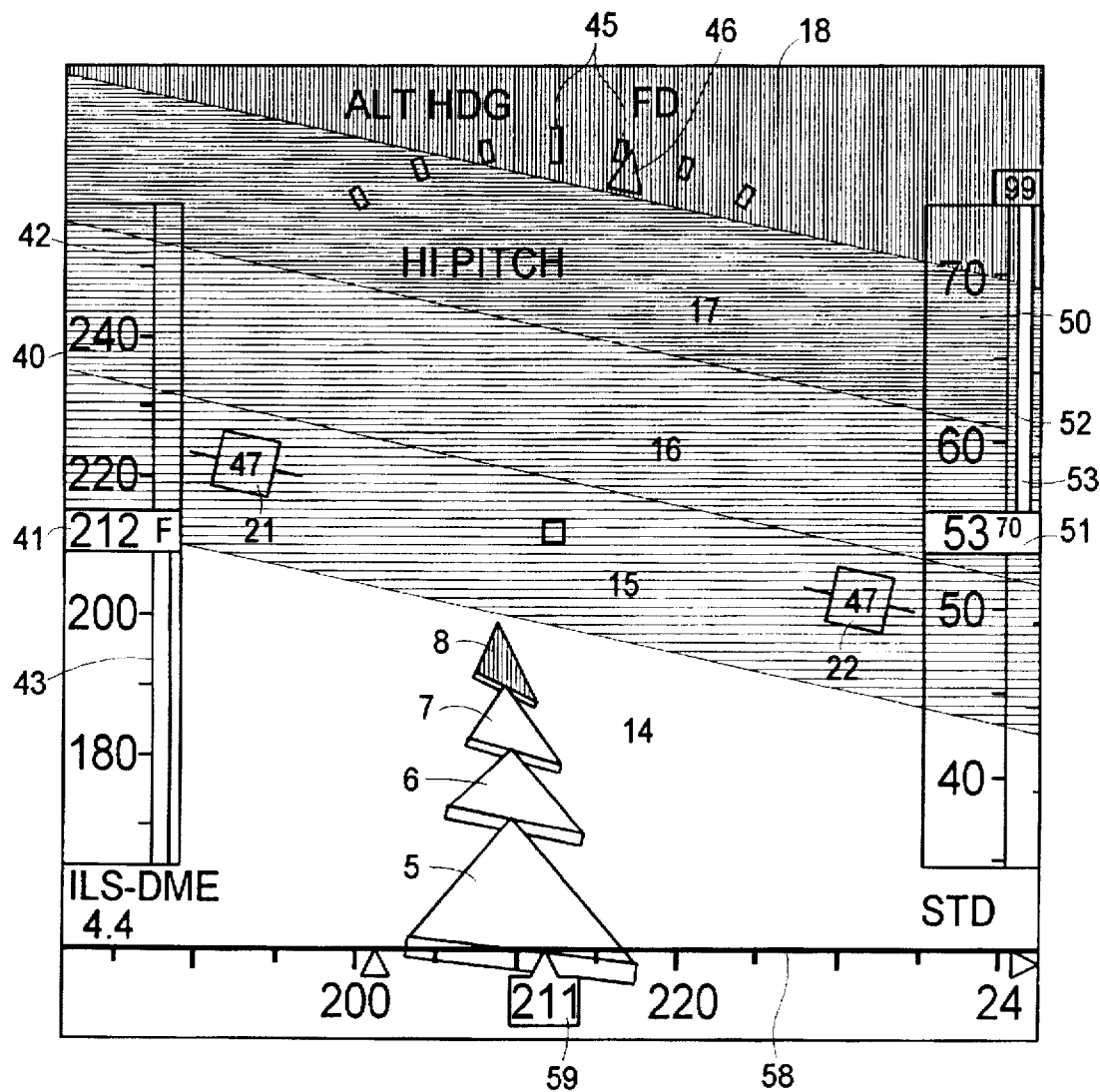
FIG. 2 is an illustration of a display screen image according to the invention for an aircraft which is steeply climbing.

More strips are visible in FIG. 2, namely strips 14 to 18, since the aircraft is situated in a steeply climbing flight, the pitch angle being 47°. The horizon is no longer visible. The differences between strips 11, 12 and 13 are not illustrated in FIG. 2. Even without a visible horizon the pilot receives graphic information on the roll angle (the slant of the strips) and on the pitch angle (the hue of the sky). In order to emphasise the pitch angle or the pilot's apparent line of vision even more clearly at large pitch angles, the uppermost strip 18, which corresponds to pitch angles greater than 70°, is displayed in a warning color. It can also be seen from FIG. 2 that when the pitch angle increases further a critical flight situation occurs; this is shown by the change of color of symbol 8.

Two markers 21, 22 are provided for indicating the pitch angle. These indicate the pitch angle firstly by their position in relation to the horizon and secondly numerically.

The markers 21, 22 are transparent, so that the background is visible through the markers. Particularly in the range of smaller pitch angles, when the horizon 1 passes through the markers 21, 22, a change in sign of the pitch angle is easily identifiable by a color change inside the markers. FIG. 1 also illustrates another embodiment, namely one in which the respective symbol which as such represents the instantaneous (in the case of FIG. 5) or future position (symbol 6) of the aircraft, collapses into the plane of the ground in the event of a contact with the ground. There is contact with the ground when the shadow 23, 24 of a symbol coincides with the latter. In the representation shown in FIG. 2 this is the case for symbols 7 and 8.

Other indications which are visible on the screen image are described below. A region 40 at the left edge of the screen image is provided for the speed. The speed is numerically indicated in knots in field 41. A scale 42 which runs vertically is displaced depending on the speed in such a way that the numerical indications are shown above a corresponding point on the scale. A bar type marker 43 provides an indication of the trend in speed. In the screen image shown in FIG. 1 this is positive, and in FIG. 2 it is strongly negative. In FIG. 2 an F is superimposed on the image near the scale 42, in order to indicate that the landing flaps should be lowered at this speed.

Together with a pointer 46, the markers 45 superimposed on the top part of the screen image constitute an indication of the roll angle. In FIGS. 2 to 6 a row of alphanumeric characters which comprise information on the autopilot is provided above the roll angle indicator. For example, in the flight situation represented in FIG. 4 the autopilot AP is switched on. Moreover, a flight director FP is being employed. A reference ILS to an instrument landing system for a runway 07R is also given there. Warning signs may be superimposed below the roll angle indicator, for example HI BANK for a roll angle which is too large (FIG. 1) or HI PITCH for a pitch angle which is too large (FIG. 2).

Flight altitude information is displayed in a region 50 at the right-hand edge of the screen image. The respective flight altitude is indicated numerically in feet in a central field 51. A scale 52 runs vertically, apparently underneath field 51, and moves depending on the flight altitude in such a way that the numerical indication appears in front of the corresponding point on the scale. The length of a bar type marker 53 which starts from field 51 represents the variometer indication. A descent of the aircraft is indicated in FIG. 1; an ascent of the aircraft is indicated in FIG. 2. The combination of letters STD underneath field 50 signifies the mode set for the altimeter.

A horizontally extending scale 58 for indicating the course is provided in the bottom region of the screen image. As for the altitude and speed indications, this scale also has a stationary field 59 in which the heading is numerically indicated. The scale 58 is moved horizontally in an appropriate manner for this purpose.

Figure 3:
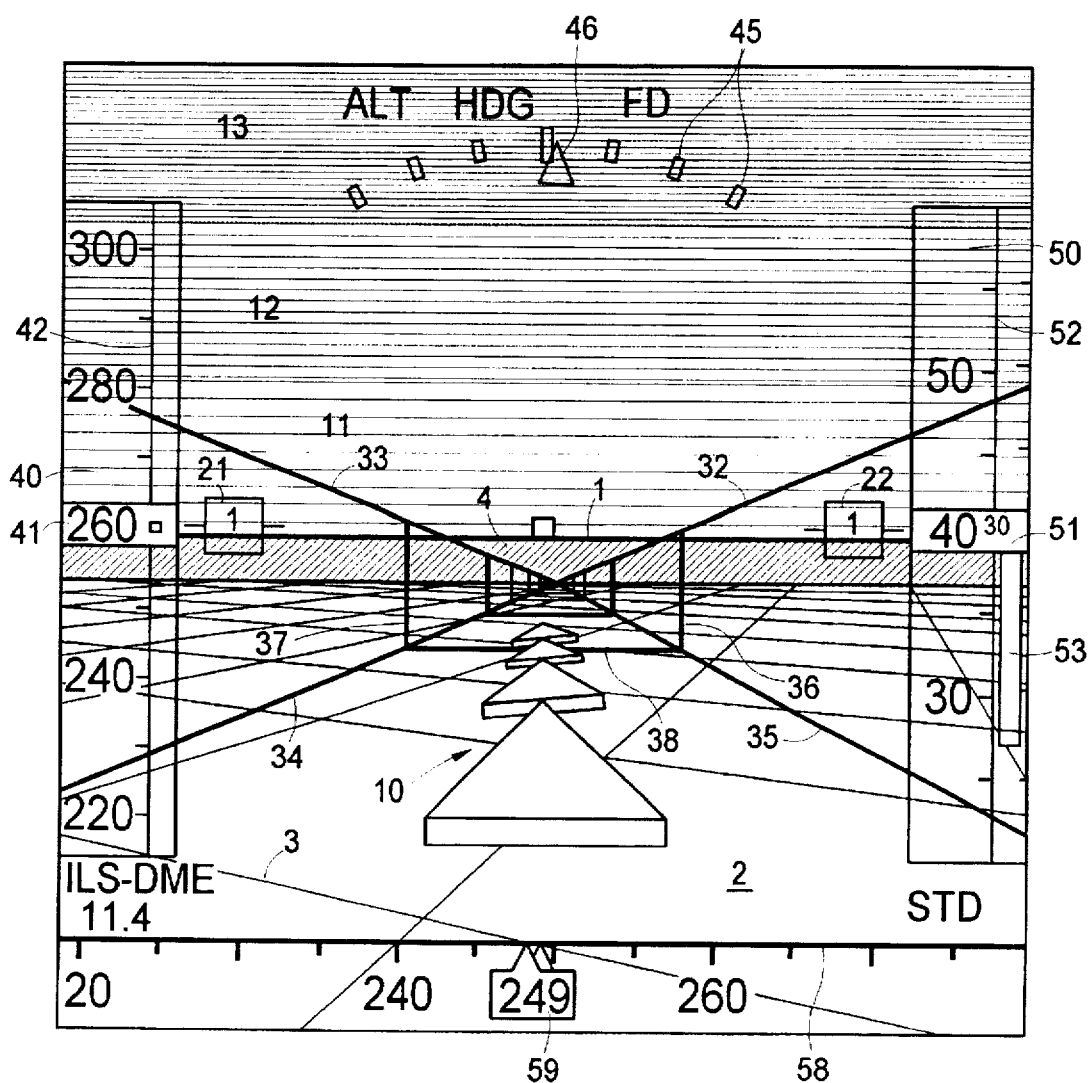
FIG. 3 is an illustration of a display screen image according to the invention for an aircraft which is on final approach to landing in the proper landing approach lane.

FIG. 3 shows another screen image in which a flight situation is represented which is different from those of FIGS. 1 and 2. This corresponds to a landing approach flight, in which the aircraft is situated in an approach lane, the boundaries of which are represented by corresponding straight lines, of which only lines 32 to 38 are provided with reference numerals.

Figure 4:
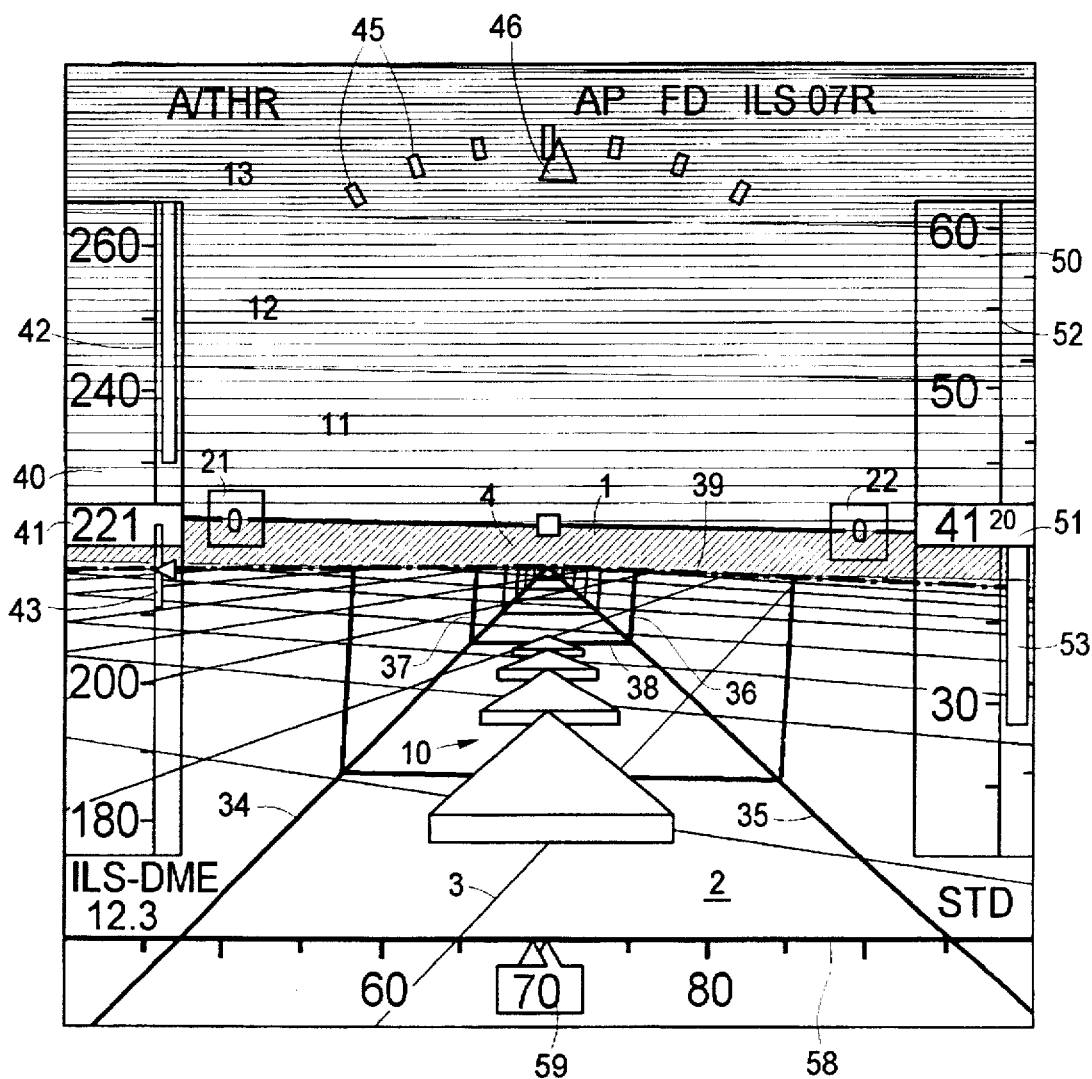
FIG. 4 is an illustration of a display screen image according to the invention for an aircraft which is on final approach to landing above the proper approach lane.

Whereas in the flight situation represented in FIG. 3 the aircraft is situated within the approach lane, in the flight situation represented in FIG. 4 it is too high. This is emphasised by a line 39 which closes the flight lane at the top being displayed in a warning color. This is emphasised by the dash-dot line in FIG. 4.

Figure 5:
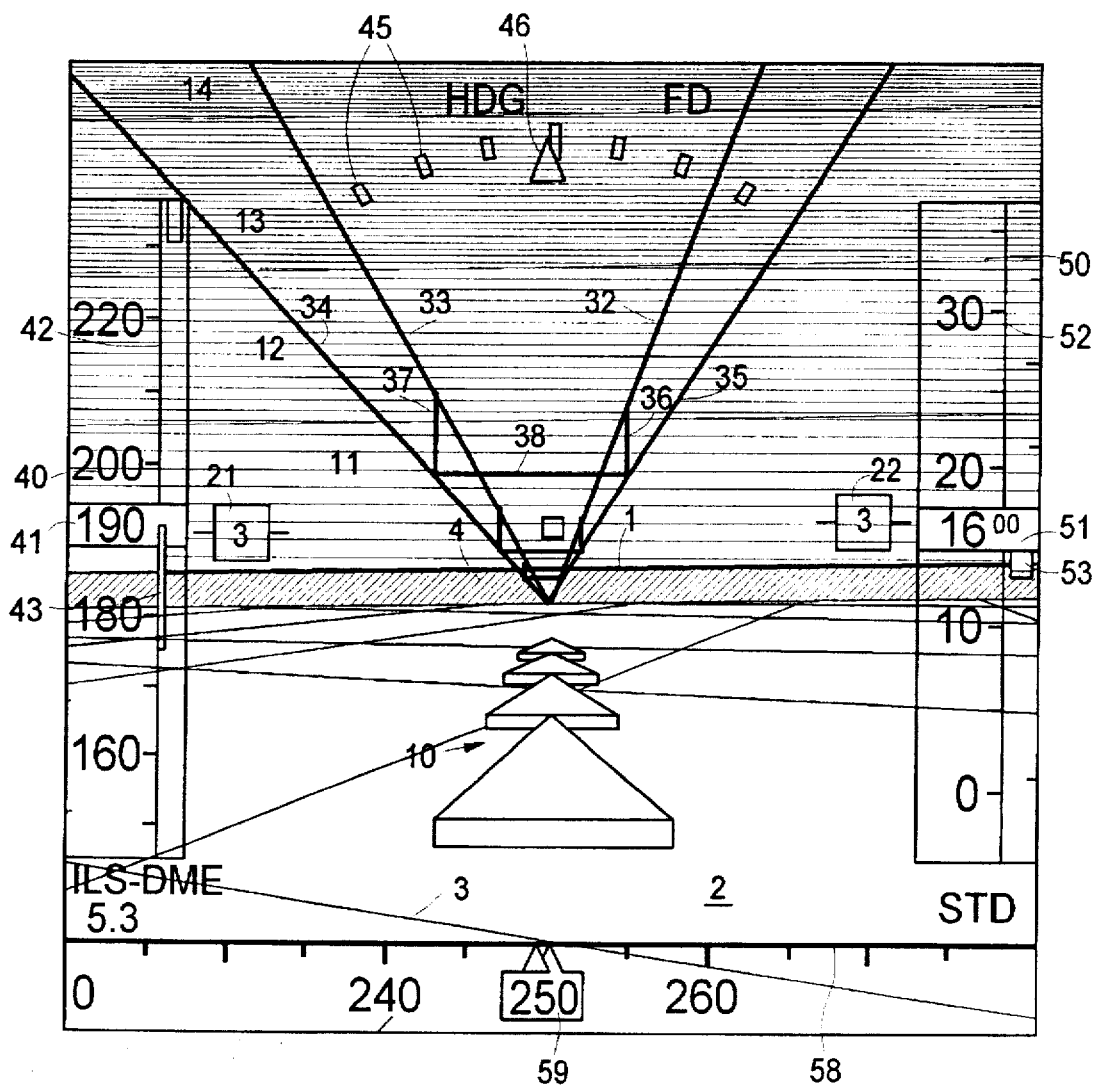
FIG. 5 is an illustration of a display screen image according to the invention for an aircraft which is on final approach to landing below the proper approach lane.

In the flight situation represented in FIG. 5 the aircraft is below the approach lane 32 to 38. This is firstly made clear by the view of the approach lane from below. Secondly, it is emphasised by a line.

Figure 6:
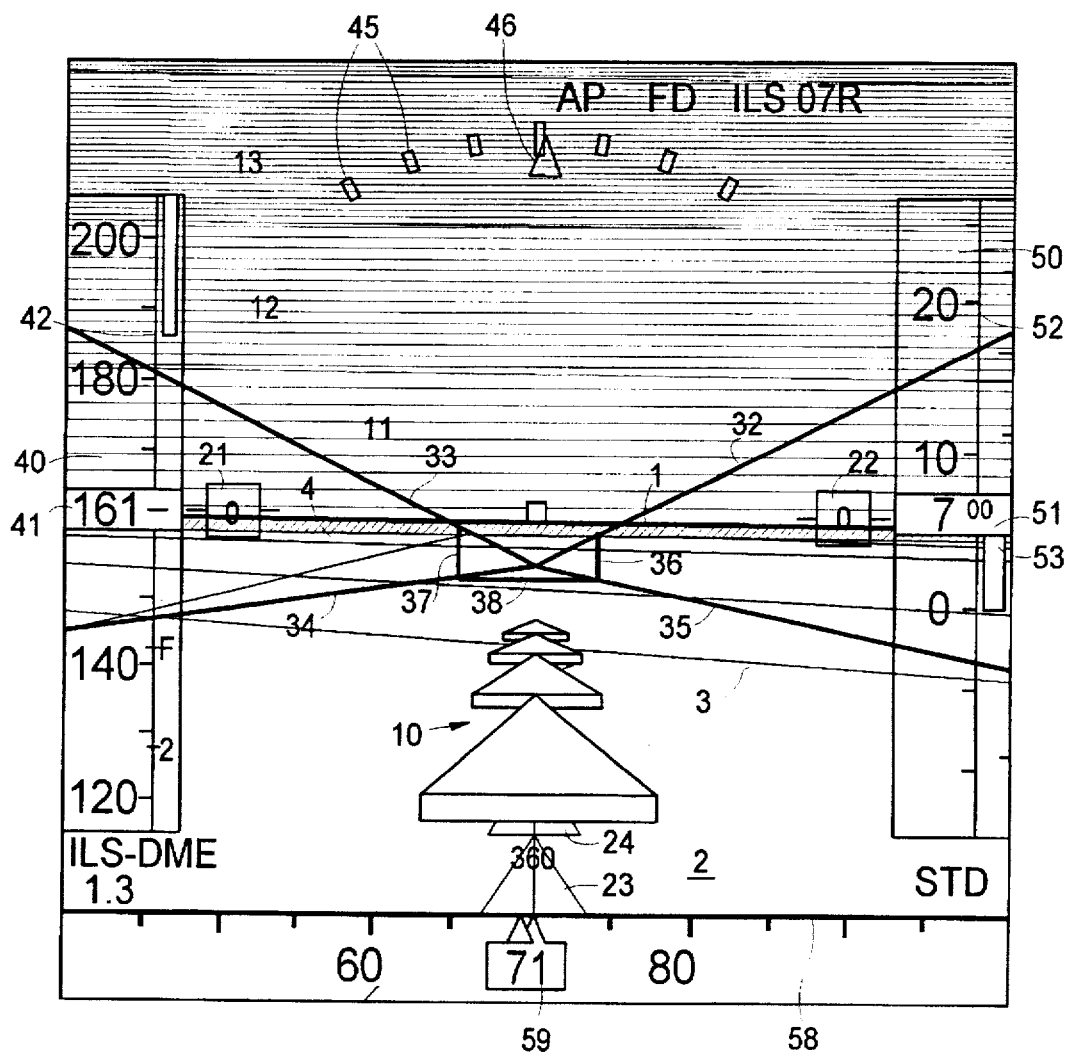
FIG. 6 is an illustration of a display screen image according to the invention for an aircraft which is on final approach to landing in the proper approach lane and very close to the landing surface.

FIG. 6 shows a later phase of the landing approach, in which the aircraft is situated within the approach lane. In FIG. 6 the shadows 23, 24 of symbols 5, 6 are visible, corresponding to the decrease in flight altitude—namely to 730 feet—which has occurred since the flight situation shown in one of FIGS. 3 to 5. The shadows are preferably of transparent construction, namely the representations of the parts of the ground which fall within the shadows are not replaced by the color of the shadow, but appear through the shadow.

There has thus been shown and described a novel process of representing flight guidance information which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

We claim:

1. In a method of representing flight guidance information of an aircraft, wherein a spatial representation of the airspace, comprising at least one horizon and the precalculated flight path of the aircraft, is produced with the aid of an image reproduction device, the improvement wherein the area above the horizon is subdivided into strips of different hue which run parallel to the horizon, and wherein a predetermined set range of pitch angles corresponds to each strip.

2. The method according to claim 1, wherein the predetermined set range of pitch angles is 10°.

3. The method according to claim 1, wherein a warning color is exhibited above a predetermined maximum pitch angle.

4. The method as claimed in claim 1, wherein numerical indications are displayed in an imaginary extension of the plane of the aircraft in the airspace, the indications being figures inside a frame, wherein respective background of sky or ground is visible in the part of the frame which is not covered by the figures.

5. The method as claimed in claim 1, wherein a shadow of the precalculated flight path projected on the ground is of transparent design.

6. The method according to claim 1, wherein the area above the horizon is displayed in blue.

7. The method according to claim 4, wherein there are two numerical indications of the pitch angle.

8. The method according to claim 2, wherein a warning color is exhibited above a predetermined maximum pitch angle.

9. In a method of representing flight guidance information of an aircraft, wherein a spatial representation of the airspace, comprising at least one horizon and the precalculated flight path of the aircraft, is produced with the aid of an image reproduction device, the improvement wherein vertical deviations from a scheduled flight path displayed in the airspace are displayed as colored markers on the upper or lower peripheries respectively of a scheduled route lane encompassing the scheduled flight path.

10. The method according to claim 9, wherein the markers are lines which run parallel to the upper or lower perpheries respectively edges of the scheduled route lane.

* * * * *